(12) United States Patent
Cote

(10) Patent No.: US 7,547,394 B2
(45) Date of Patent: Jun. 16, 2009

(54) WASTEWATER TREATMENT WITH AEROBIC GRANULES

(75) Inventor: Pierre Lucien Cote, Dundas (CA)

(73) Assignee: Zenon Technology Partnership, Wilmington, DE (US)

(*) Notice: Subject to any disclaimer, the term of this patent is extended or adjusted under 35 U.S.C. 154(b) by 127 days.

(21) Appl. No.: 11/642,513

(22) Filed: Dec. 21, 2006

(65) Prior Publication Data

US 2007/0181493 A1    Aug. 9, 2007

Related U.S. Application Data

(60) Provisional application No. 60/752,023, filed on Dec. 21, 2005.

(51) Int. Cl.
*C02F 3/30*    (2006.01)
*C02F 3/08*    (2006.01)

(52) U.S. Cl. ............................ 210/605; 210/617

(58) Field of Classification Search ............... 210/605, 210/615–617, 630, 906, 907
See application file for complete search history.

(56) References Cited

U.S. PATENT DOCUMENTS

| | | | | |
|---|---|---|---|---|
| 4,167,479 A | * | 9/1979 | Besik | 210/610 |
| 4,500,429 A | * | 2/1985 | Reimann et al. | 210/616 |
| 4,566,971 A | | 1/1986 | Reimann et al. | |
| 4,623,464 A | * | 11/1986 | Ying et al. | 210/616 |
| 5,254,253 A | * | 10/1993 | Behmann | 210/607 |
| 5,582,733 A | * | 12/1996 | Desbos et al. | 210/605 |
| 5,599,451 A | * | 2/1997 | Guiot | 210/605 |
| 5,776,344 A | * | 7/1998 | McCarty et al. | 210/605 |
| 5,885,460 A | * | 3/1999 | Dague, et al. | 210/605 |
| 5,985,150 A | | 11/1999 | Versprille et al. | |
| 6,024,876 A | * | 2/2000 | Pannier et al. | 210/616 |
| 6,306,302 B1 | * | 10/2001 | Maree et al. | 210/605 |
| 6,406,629 B1 | | 6/2002 | Husain et al. | |
| 6,485,645 B1 | | 11/2002 | Husain et al. | |
| 6,566,119 B1 | | 5/2003 | Heijnen et al. | |
| 6,780,319 B1 | | 8/2004 | Thieblin et al. | |
| 6,793,822 B2 | | 9/2004 | Tay et al. | |
| 7,008,538 B2 | | 3/2006 | Kasparian et al. | |
| 7,060,185 B2 | | 6/2006 | Kim et al. | |
| 2003/0038080 A1 | * | 2/2003 | Vriens et al. | 210/605 |
| 2004/0178132 A1 | | 9/2004 | Nakhla et al. | |
| 2004/0206699 A1 | * | 10/2004 | Ho et al. | 210/605 |
| 2004/0206700 A1 | * | 10/2004 | Kim et al. | 210/605 |
| 2006/0032815 A1 | | 2/2006 | Van Loosdrecht et al. | |

FOREIGN PATENT DOCUMENTS

| | | |
|---|---|---|
| JP | 3-258395 | * 11/1991 |
| JP | 5-337492 | * 12/1993 |
| WO | WO0105715 | 1/2001 |
| WO | WO2004024638 | 3/2004 |

OTHER PUBLICATIONS

De Kreuk, MK et al., "Aerobic Granule Reactor Technology", Stowa Report, Jun. 2003, pp. 1-55.
Liu, Y et al, "State of the Art of Biogranulation Technology for Wastewater Treatment", Biotechnology Advances, 2004, pp. 533-563.
Williams, Jon Christopher, "Initial Investigations of Aerobic Granulation in an Annular Gap Bioreactor", Releigh, 2004, pp. 28-79 and 111-114.
Tranh, Bui Xuan, "Aerobic Granulation Coupled Membrane Bioreactor", Asian Institute of Technology, May 2005.

* cited by examiner

*Primary Examiner*—Fred Prince

(57) ABSTRACT

A wastewater treatment system using aerobic granules has a large number of sequencing batch reactor tanks with high volumetric exchange rate, a variable cycle length and constant batch volume. The batch reactors are operated for C, N removal and P is removed chemically, optionally under BioP enhanced conditions. SS are removed in a downstream separation step.

7 Claims, 2 Drawing Sheets

WASTEWATER TREATMENT WITH AEROBIC GRANULES

This is an application claiming the benefit under 35 USC 119(e) of U.S. application Ser. No. 60/752,023 filed Dec. 21, 2005. U.S. application Ser. No. 60/752,023 is incorporated herein, in its entirety, by this reference to it.

FIELD

This specification relates to wastewater treatment.

BACKGROUND

The following discussion is not an admission that anything discussed below is citable as prior art or part of the knowledge of people skilled in the art. Any statements regarding the results, performance or inventiveness etc., relating to patents or publications discussed below, are the representations of the alleged inventors of those patents or publications and the present inventor does not admit that any such statements are true.

Granules are dense agglomerates of biomass. Compared to floc or activated sludge, the granules are denser, stronger and settle at a higher velocity. Individual granules may be roughly spherical with a diameter of 1-2 mm, a density of 60-90 g/L and a settling velocity of 30-40 m/hr. Granules may be aerobic or anaerobic as determined by the primary mode of digestion of microbes in the biomass. Anaerobic granules have been commercialized in upflow anaerobic sludge blanket (UASB) reactors.

U.S. Pat. No. 6,566,119 relates to a method of acquiring granular growth of a microorganism in a reactor containing a liquid medium. Surprisingly, according to the invention, aerobic microorganisms are induced to granular growth by maintaining specific culture conditions. During a first step an oxygen-containing gas is supplied and the reactor contents are kept in turbulence. In a second step, after a short settling period, the top part of the reactor medium is discharged.

U.S. Pat. No. 6,793,822 describes a method of producing aerobic biogranules for the treatment of waste water comprising the steps of: a) introducing waste water into a reactor; b) seeding the reactor with a active biomass material; c) supplying the oxygen-containing gas to the reactor to provide a mixing action to the suspension of biomass material in said waste water, the supply of oxygen-containing gas providing a superficial upflow gas velocity greater than 0.25 cm/s; d) initiating a period of nutrient starvation of the biomass material while continuing to supply oxygen-containing gas; e) allowing formed aerobic granules to settle in a settling zone in said reactor; f) discharging at least a portion of the waste water; g) repeating steps (a) to (f) until at least a portion of the biogranules in said settling zone are within a predetermined properties; and h) recovering said biomass granules within those predetermined properties.

International Publication No. WO 2004/024638 relates to a method for the treatment of wastewater comprising an organic nutrient. According to the invention, the waste water is in a first step fed to sludge granules, after the supply of the waste water to be treated the sludge granules are fluidised in the presence of an oxygen-comprising gas, and in a third step, the sludge granules are allowed to settle in a settling step. This makes it possible to effectively remove not only organic nutrients but optionally also nitrogen compounds and phosphate.

U.S. Pat. No. 6,780,319 describes a method of purifying wastewater charged with organic matter which comprises a step of biologically treating the water, during which the organic matter contained in the water is degraded by microorganisms thereby producing sludge, and a water-sludge separation step, the sludge coming from the separation step being recycled in the biological treatment step, this method being characterized in that it further comprises a step of degrading the sludge, coming either from the biological treatment step or from the separation step, during which the sludge is brought into contact with an ozonated gas under conditions making it possible to obtain a floc consisting of granules whose mean size is greater than 200 microns, the volatile matter content is between 50 and 65%, the thickening factor of this granular sludge, after 30 minutes of settling, always being greater than 4, the conditions for obtaining the said granular sludge consisting in: treating between 0.1 and 2 times the mass of sludge present in the biological treatment step per day and preferably between 0.7 and 1.5 and, applying an ozone dose of between 3 and 100 grams of ozone per kilogram of treated suspended matter (SM), preferably between 4 and 10 grams of ozone per kilo of treated SM.

U.S. Pat. No. 5,985,150 is directed to a process for the aerobic purification of wastewater in a reactor containing unsupported granular active sludge. The oxygen necessary for maintaining aerobic conditions within the reactor is provided in the form of an oxygen-containing gas. The oxygen-containing gas is preferably introduced into the reactor at such a place that the oxygen-containing gas provides at least some mixing action in the reactor. The invention also provides a reactor suitable for this process.

SUMMARY

The following summary is intended to introduce the reader to this specification but not to define any invention. One or more inventions may reside in a combination or sub-combination of apparatus elements or process steps described in this summary or in other parts of this document, for example the detailed description or the claims.

Various mechanisms promote growth of granules. The inventors believe that mechanisms that provide granule growth may include one or more of (a) the selection of species that tend to aggregate by periodically washing-off less dense floc; (b) cycling between periods of feasting and fasting; (c) selecting slow-growing organisms through a long anaerobic period; and, (d) applying a minimum level of shear at least from time to time. Attempting to provide these conditions, however, create various challenges. For example, some conditions may be provided by using a batch process. For large applications, such as municipal wastewater, matching the feed flow to flow through a batch reactor is difficult. For further example, washing off floc also washes off suspended solids. The washed off material cannot be returned to a reactor containing the granules or species selection will be compromised. Yet further, because granules have a low growth rate, granule wastage does not remove significant amounts of phosphorous.

This specification describes one or more apparatuses or processes that may address one or more of these issues or the desire to treat wastewater with aerobic granules. In general, granules can be grown in a sequencing batch reactor having 3 phases. In a first phase, a feed can be provided to the reactor in a generally plug flow form without air while effluent is simultaneously drawn from the reactor. This simultaneously charges the reactor with feed, removes treated effluent from a previous batch and provides a period of anaerobic digestion. In a second phase, the reactor can be aerated and mixed. The aeration rate can be cycled to provide aerobic and anoxic conditions to oxidize COD and provide nitrification and denitrificaton. In a third phase, mixing and aeration can be stopped to allow the granules to settle and allow treated effluent to rise to the top of the reactor.

To adapt a batch process to large continuous, possibly variable rate, feed flows, a number of reactors are provided in parallel and fed in sequence. For example, feed may be fed upwards through a bed of settled granules at a high velocity; for example, at a nominal velocity of 4 m/hr or more, or about 4-6 m/hr. The reactor volume exchange height and the feed velocity may be chosen to provide a feed time that, when multiplied by the number of reactors, equals the total cycle time. In this way, feed can be cycled through the reactors to avoid or reduce the need for feed equalization. The high feed velocity also washes off almost all flocculated biomass to enhance the selection of granules in the reactor.

To deal with washed-off suspended solids, the washed-off stream is treated in a downstream separation step. This downstream step may comprise a filtering membrane or a fine mesh screen. The separation device may operate in dead end flow or without recirculation to the granule reactor.

To remove phosphorous from the feed, advantage is taken of the fact that, for example during an anaerobic step, a small amount of liquid can be extracted from the reactor. Phosphorous can be precipitated from this liquid chemically.

DETAILED DESCRIPTION

Various apparatuses or processes will be described below including an example of an embodiment of each claimed invention. No embodiment described below limits any claimed invention and any claimed invention may cover processes or apparatuses that are not described below. The claimed inventions are not limited to apparatuses or processes having all of the features of any one apparatus or process described below or to features common to multiple or all of the apparatuses or processes described below. It is possible that an apparatus or process described below is not an embodiment of any claimed invention. All rights are reserved in any invention disclosed in an apparatus or process that is not claimed in this document. Any one or more features of any one or more embodiments can be combined with any one or more features of any one or more other embodiments.

Figure 1:
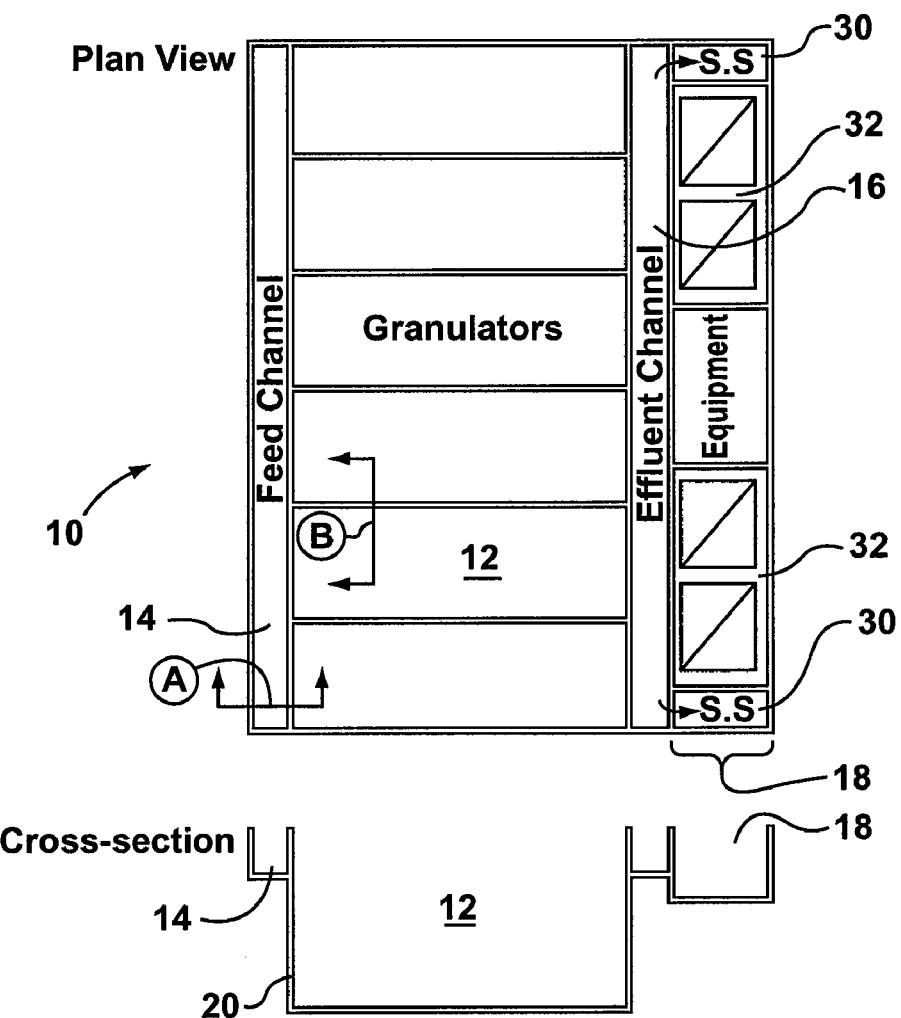
FIG. 1 shows a schematic plan and elevation view of a treatment system.
Figure 2:
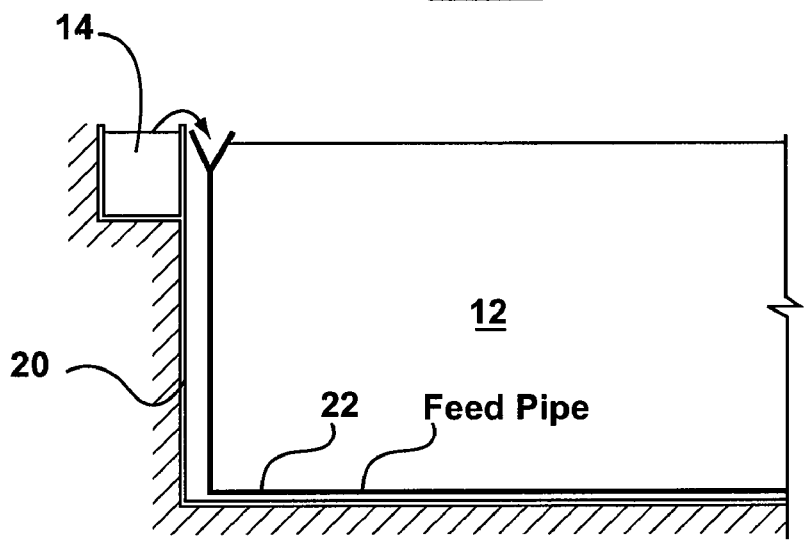
FIG. 2 is an enlarged elevation view of part of the system shown as Part A in FIG. 1.

The description below relates to a design for a 4,800 $m^3$/d (200 $m^3$/h) plant illustrated in FIGS. 1, 2 and 3. A peaking factor of up to 3 is assumed. Design details are given in Table 1 and key aspects are described below. For larger plants, the number of granulators may remain the same, but their size may be increased to maintain the same HRT.

The general layout (FIG. 1) involves a number of parallel granulators 12 that can accommodate continuous flow without equalization. The feed flow is directed by gravity from a feed channel 14 to the granulators 12 on a rotation basis. As one granulator 12 is fed, it displaces treated water that overflows into an effluent channel 16 and is directed to a downstream separation step 18.

Each granulator 12 is an in-ground, rectangular tank 20. It is equipped with a mechanism, for example an airlift pump or a gate valve, to transfer feed flow from the feed channel 14 to the tank 20. Once in the tank 20, the feed is directed via one or several pipes 22 that runs along the wall to the bottom of the tank 20 and are evenly distributed along the length of the tank 20 (FIG. 2).

Figure 3:
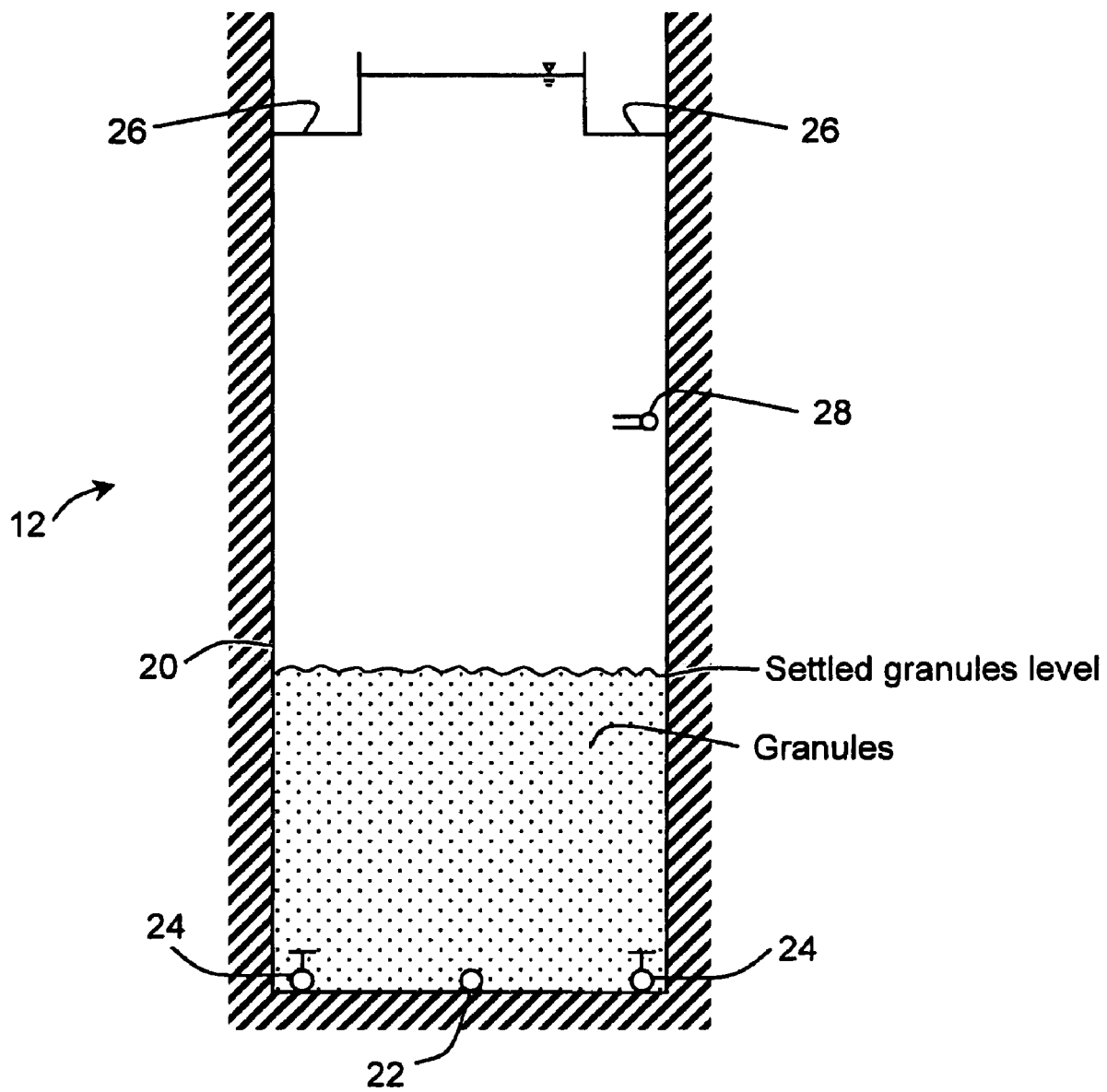
FIG. 3 is an elevation view of Part B of FIG. 1.

FIG. 3 shows another cross-section of the tank 20 with the position of the feed pipe 22, aerators 24 and effluent collection troughs 26. It also shows an extraction grid 28 at mid-height that is used for:

Extracting phosphate-rich liquor for chemical precipitation

Extracting treated effluent during periods of extreme low flow (when the fill/draw velocity is too low to wash off the flocculated biomass, for example, when the fill/draw velocity is about 4 m/h or less)

Extracting excess granules (the grid level determines the maximum level of settled granules in the tank)

The number of granulators 12 is determined by the total cycle time and the tank 20 depth. With the assumptions listed in Table 1, the plant would have 6 granulators 12.

The granulator 12 tanks 20 are built as elongated rectangles (2.9 m×11.5 m) to facilitate vertical plug flow during fill/draw although other shapes might also be used.

The feed may rise at a velocity of about 6 m/h (Average Daily Flow—ADF) and displace the treated water from the tank to the effluent channel. The flow rate to a single granulator is limited to 1.5×ADF (9 m/h) in order to promote plug flow and avoid washing off granules. At flow rates >1.5 ADF (determined for example by monitoring the level in the feed channel), 2 granulator tanks may be operated in parallel. Under these conditions, the maximum flow can be increased without exceeding the maximum fill/draw velocity. Under peaking conditions, for example rain weather flow, the plant HRT drops and the treatment sequence may be modified (e.g., reduce the denitrification periods to ensure complete COD removal).

Provisions may be made to wash off the flocculated biomass during extended periods of low flow. If the flow drops below 0.5 ADF (or fill/draw velocity <about 3 m/h) washing off may be compromised and the mid-height extraction grid (FIG. 3) can be used to extract the treated water.

TABLE 1

Preliminary design for a Zenon granule-based plant

| Assumptions | | | |
|---|---|---|---|
| MLSS (granules) | | 15 g/L | |
| | Value | Units | Comment |
| Influent | | | |
| COD | 500 | mg/L | |
| Average dairy flow(ADF) | 4,800 | m3/d | |
| Dry weather flow(DWF) peak | 1.5 | | |
| Rain weather flow(RWF) peak | 3.0 | | |

TABLE 1-continued

Preliminary design for a Zenon granule-based plant

Granulator (ADF)

| | | | |
|---|---|---|---|
| Number of granulators in parallel | 1 | | |
| Cycle time | 5.0 | h | |
| Flow rate | 200 | m3/h | |
| Liquid depth | 6 | m | |
| Volume Exchange Ratio | 83% | | 5/6 m replaced during feed/bleed |
| Feed/bleed velocity | 6 | m/h | |
| Feed/bleed duration | 0.83 | h | |
| Feed introduced into granulator | 166 | m3 | |
| Granulator footprint | 33 | m2 | |
| Granulator aspect ratio | 4.0 | | ratio of length to width |
| Granulator width | 2.9 | m | |
| Granulator length | 11.5 | m | |
| Volume of one granulator | 200 | m3 | |
| Number of granulators | 6.0 | | make this number integer(change cycle time) |

Granulator (DWF)

| | | | |
|---|---|---|---|
| Number of granulators in parallel | 1 | | |
| Flow rate | 300 | m3/h | |
| Feed/bleed velocity | 9 | m/h | Maximum to avoid washing off granules |
| Feed/bleed duration | 0.55 | h | |
| Cycle time | 3.3 | h | |

Granulator (RWF)

| | | | |
|---|---|---|---|
| Number of granulators in parallel | 2 | | |
| Flow rate | 600 | m3/h | |
| Feed/bleed velocity | 9 | m/h | Maximum to avoid washing off granules |
| Feed/bleed duration | 0.55 | h | |
| Cycle time | 1.7 | h | |

Total Plant

| | | |
|---|---|---|
| HRT (ADF) | 6.0 | h |
| HRT (DWF) | 4.0 | h |
| HRT (RWF) | 2.0 | h |
| Volumetric loading (ADF) | 2.0 | kgCOD/m3/d |
| Mass loading (ADF) | 0.13 | kgCOD/kgMLSS/d |

Calculated numbers are highlighted

The cycle times indicated below are calculated based on the average daily flow (ADF); these can vary, for example they may be reduced at higher flow as indicated in Table 1.

Step 1: Fill and Draw (50 min)
Air is off
Feed is from the bottom
Velocity is 5-15 m/h (nominal 10 m/h)
Flow is through the settled granule bed
Flocculated biomass is washed off
Treated water (with flocculated biomass) overflows into the collection trough 26.

Step 2: Anaerobic React—Optional (30 min)
This step is introduced if the fill/draw step is too short to effect $PO_4$ release
Feed is off
Short burst of air to remix the tank but minimize $O_2$ transfer
Substrate impregnates the granules
PAOs take up VFA and release $PO_4$ Step 3: PO4 Extraction—Optional (10 min)
This step is optional because it is possible that the wastage of flocculated biomass (along with the eroded portion of granules), and the direct wastage of granules is sufficient to meet the less stringent discharge criteria for phosphorus discharge (e.g. 2 mg/L). For tighter discharge criteria, or to implement nutrient recovery, the following method is used.

At the end of the anaerobic phase, $PO_4$ has been released and its concentration in solution can reach 4-6 times that of the feed concentration (i.e. up to 50 mg/L)

A volume of $PO_4$-rich supernatant is drawn off the mid-height extraction grid 28
(this volume should be equivalent to 10-20% of the tank volume; see mass balance in Appendix I))

The extracted volume can be processed a number of different ways:
1) precipitated with a coagulant ($FeCl_3$, alum) and put back in the granulator
2) as 1), but put back into the influent channel 14 (simpler valve arrangement)
3) as 1), but discharged to the effluent channel 16 (increases COD and $NH_4$)
4) precipitated with a magnesium salt to form struvite (Mg $NH_4PO_4.6H_2O$)

Step 4: Aerobic/Anoxic React (200 minutes)
Process air is turned on and off to oxidize COD, nitrify/denitrify, and cause $PO_4$ re-absorption
Dissolved oxygen is high (for example >2.0 mg/L) during periods of aeration to promote penetration into the granules
This step also ensures proper shearing of the granules and a sufficient fasting time at the end
This step may end with an air-off period to minimize the presence of $NO_3$ in the effluent and in the reactor at the beginning of the anaerobic period.

Step 5: Settle (10 minutes)
Air is off to allow granules to settle before starting fill/draw
The suspended solids that need to be continuously removed from the granulators 12 include the feed SS, the flocculated biomass and the sheared off portions of the granules. It is estimated that this could be as high as 100 mg/L. As well, this stream will contain trash if the granulators work without fine screening, The downstream separation step is different from typical MBR or tertiary filtration processes because the membrane reject is not recycled back to the granulators 12. The reject is concentrated and taken out as sludge.

In the separation system 18 there may be a static screen 30 to take out trash as a pretreatment to a membrane step 32. This could be a sufficient treatment for discharge to meet 25 mg/L SS, especially with a tight screen mesh in the static screen 30. The membrane filtration unit 32 may be designed to:
- Tolerate high SS
- Work at high recovery
- Operate in dead-end to minimize energy Critical Evaluation Benefits of the design described above may include one or more of the following:
- Since flocculated biomass is generally eliminated from the reactor, a larger concentration of granules may be maintained (for example up to 20 g/L)
- The VER may be >75%, which translates into a higher volumetric loading rate (>2 kg COD/m³/d)
- The process may be very stable with variable flow rate in terms of maintaining the granules in the reactor and washing off the flocculated biomass
- Process control is simplified
- SS solids are removed in a downstream unit process
- High biomass (>15 g/L) with easy separation
- Low SS to effluent offering the opportunity to reduce cost of final separation
- C, N and P treatment without recirculation of mixed liquor
- Reliable chemical P removal enhanced by biop principles (low stoichiometric ratio of coagulant)
- Low loading and low sludge yield
- Ability to implement nutrient recycle by struvite precipitation
- Sequencing batch reactors (SBR) without need for equalization, upstream or downstream
- Excellent ability to peak without washing off biomass Design and operating philosophies may include one or more of:
- Large number of small SBR tanks with high volume exchange ratio (VER) (for example >75%), a variable cycle length and constant batch volume to deal with variable flow
- Focus granulator on C, N removal, remove P chemically (under BioP enhanced conditions) and remove SS in a downstream step A phosphorous mass balance for the reactor is as shown below.

$$P_{in} = P_{out}$$

$$P_{in} = P_{eff} + P_{SS} + P_{WG} + P_{ext}$$

$P_{in}$: mass of phosphorous in the feed
$P_{eff}$: mass of phosphorous dissolved in effluent
$P_{SS}$: mass of phosphorous in effluent suspended solids
$P_{WG}$: mass of phosphorous present in wasted granules
$P_{ext}$: mass of phosphorous extracted (during anaerobic step)

Defining x as the fraction of the feed flow that needs to be extracted during the anaerobic step $$P_{in} = Q \cdot C_{in}$$

$$P_{eff} = (1-x) \cdot Q \cdot C_{eff}$$

$$P_{SS} = (1-X) \cdot Q \cdot SS_{eff} \cdot C_{bact}$$

PWG is assumed to be negligible as granules are very low growth not wasted in significant amount $$P_{ext} = x \cdot Q \cdot C_{ext}$$

$$Q \cdot C_{in} = (1-x) \cdot Q \cdot C_{eff} + (1-x) \cdot Q \cdot SS_{eff} \cdot C_{bact} + x \cdot Q \cdot C_{ext}$$

$$x = \frac{C_{in} - (C_{eff} + SS_{eff} \cdot C_{bact})}{C_{ext} - (C_{eff} + SS_{eff} \cdot C_{bact})}$$

EXAMPLE $C_{in}$=10 mg/L
$C_{ext}$=50 mg/L (soluble P after anaerobic release)
Ceff=0.1 mg/L (soluble P in effluent (after aerobic uptake))
$SS_{eff}$=50 mg/L
$C_{bact}$=0.02 mg/L (P in flocculated bacteria in effluent)
x=18.2%

I claim:

1. A method of treating wastewater comprising steps of:
   a. providing a set of sequencing batch reactors; and
   b. feeding wastewater through a bed of granules in each reactor for a feed time, the feed time being part of a cycle time for each reactor;
   wherein the feed time for each reactor multiplied by the number of reactors is generally equal to the cycle time for each reactor.

2. The method of claim 1, wherein each cycle comprises:
   i. treating wastewater anaerobically with the granules; and
   ii. treating wastewater aerobically with the granules.

3. The method of claim 2, wherein each cycle further comprises:
   iii. treating wastewater under alternating anoxic and aerobic conditions with the granules.

4. The method of claim 1 further comprising a step of removing effluent from the set of sequencing batch reactors and filtering the removed effluent to remove suspended solids from the removed effluent.

5. The method of claim 4 wherein the removed effluent is filtered by membrane separation.

6. A method of treating wastewater comprising,
   (a) feeding wastewater to a zone having granules;
   (b) treating wastewater under anaerobic conditions with the granules;
   (c) treating wastewater under alternating anoxic and aerobic conditions with the granules;
   (d) settling the granules:
   (e) withdrawing treated wastewater from the zone;
   (f) mixing the granules and the wastewater during steps (b) and (c); and,
   (g) halting mixing the granules and the wastewater during step (d) to settle the granules.

7. The method of claim 6, wherein steps (a) to (e) are part of a cycle having a cycle time, and step (c) comprises less than 5% of the cycle time.

* * * * *